US008671615B2

(12) United States Patent
Kumar

(10) Patent No.: US 8,671,615 B2
(45) Date of Patent: Mar. 18, 2014

(54) METHOD OF TANDEM CROPPING FOR INCREASED PRODUCTION OF FOOD GRAIN CROPS

(75) Inventor: Sushil Kumar, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 209 days.

(21) Appl. No.: 12/918,103

(22) PCT Filed: Sep. 4, 2008

(86) PCT No.: PCT/IN2008/000567
§ 371 (c)(1),
(2), (4) Date: Nov. 21, 2011

(87) PCT Pub. No.: WO2009/104203
PCT Pub. Date: Aug. 27, 2009

(65) Prior Publication Data
US 2012/0055084 A1    Mar. 8, 2012

(30) Foreign Application Priority Data

Feb. 19, 2008    (IN) .............................. 418/DEL/2008

(51) Int. Cl.
*A01G 1/00*    (2006.01)
(52) U.S. Cl.
USPC ....................................................... 47/58.1 R
(58) Field of Classification Search
USPC .................. 47/58.1 R–58.1 CF; 111/100
See application file for complete search history.

(56) References Cited

U.S. PATENT DOCUMENTS 3,972,706 A * 8/1976 Arnold .......................... 504/217
4,062,305 A * 12/1977 Stoker ........................... 111/149

(Continued)

FOREIGN PATENT DOCUMENTS

RU    2244415 C2 *  1/2005
RU    2302095 C2 *  7/2007

OTHER PUBLICATIONS

China: Multiple Cropping and Related Crop Production Technology (FAO plant production and protection papers) by Food and Agriculture Organization of the United Nations, Feb. 1981.*

(Continued)

*Primary Examiner* — David Parsley
*Assistant Examiner* — Danielle Clerkley
(74) *Attorney, Agent, or Firm* — Ladas & Parry LLP

(57) ABSTRACT

The present invention provides a method of tandem cropping for increased production of up to 40% in wheat and mustard crops using varieties with phenological plasticity and temperature tolerance traits. The cereal bread wheat and oil seed mustard are traditional winter season (Rabi) crops in north India/Indo-Gangetic plains. This area experiences receding levels of warm weather and long days in September, October and November, progressive increase and then decrease of cold conditions and short days between November and March and onset of warm weather turning into summer and relatively longer days in March and April. Conventionally a seasonal crop of wheat or mustard or wheat followed by mustard or vice versa could be taken in the winter Rabi season of Indo-Gangetic plains to increase the production of these commodities. The concept has not occurred to persons skilled in the art of wheat cultivation and breeding and as far as is known there is no report of tandem cultivation of wheat under natural seasonal changes of agro-climates in areas where wheat cultivation is practiced. For tandem cropping, wheat and mustard cultivars must posses properties of flowering under long day or short day conditions, tolerating temperature gradients and reaching maturity earlier than normal.

4 Claims, 2 Drawing Sheets

(56) References Cited

U.S. PATENT DOCUMENTS

| | | | | |
|---|---|---|---|---|
| 5,724,767 | A | * | 3/1998 | Sun .............................. 47/58.1 R |
| 6,631,585 | B1 | * | 10/2003 | Williams, Jr. ............... 47/58.1 R |
| PP16,566 | P3 | * | 5/2006 | Khanuja et al. |
| 7,634,869 | B1 | * | 12/2009 | Williams, Jr. ............... 47/58.1 R |

OTHER PUBLICATIONS

Temperate Horticulture: Current Scenario, Kishore et al., 2006, pp. 49-50.*

Oplinger et al., "Mustard—Alternative Field Crops Manual" (AFCM), http://www.hort.purdue.edu/newcrop/afcm/mustard.html.*

United States Department of Agriculture, National Agricultural Statistics Service Agricultural Handbook No. 628, "Usual Planting and Harvesting Dates for U.S. Field Crops", Dec. 1997, www.nass.usda.gov/Publications/Usual_Planting_and . . . /uph97.pdf.*

S.M.S. Tomar, et al; "Pusa Gold (WR 544)—A New Variety of Wheat For Very Late Sown Conditions", Intensive Agriculture, Nov.-Dec. 2004, vol. XXXXII; No. 11-12, 4 pages.

Rebecca A. Sherry, et al; "Divergence of reproductive phenology under climate warming" PNAS, vol. 104, No. 1, pp. 198-202.

* cited by examiner

METHOD OF TANDEM CROPPING FOR INCREASED PRODUCTION OF FOOD GRAIN CROPS

FIELD OF THE INVENTION

The present invention relates to a method of tandem cropping for increased production of food grain crops.

More particularly, the present invention relates to a method of tandem cropping for increased production of food grain crops using crop varieties with phenological plasticity characteristics and temperature tolerance traits.

BACKGROUND AND PRIOR ART OF THE INVENTION

In recent years, the food security is imperiled worldwide, especially in the developing world. The factors responsible include, switching of cultivation of cereals to biofuel crops in USA, Canada, Europe and Australia, climate change led global warming, depletion of food stocks and soaring prices of bread wheat and other staple food crops in global markets. The population increase, rapid economic growth and worsening global warming will add to food related social crisis in the future. Dynamic agricultural development is required to feed 10 billion people by 2050.

The demand for the cereal bread wheat *Triticum aestivum*, is suitable for consumption with least processing, is expected to increase by 50% over next twenty years, on account of population increase and increasing preference for it as a directly consumable staple food. Over the last decade, India has faced decrease in wheat production, increase in wheat consumption and large imports of wheat. India is also deficient in edible oil production and is examining alternate vegetable oils for conversion into biodiesel.

Wheat is conventionally sown in the month of November in the Indo-Gangetic climatic conditions. The average yield in farmer fields is about 3 tonnes per hectares. By the time the crop attains maturity it is March-April and the temperature is high. The grains get matured and plump when crop is ready for harvest.

Mustard is used in India as a source of edible oil and could serve as possible biofuel. Like many other countries, India seeks to increase wheat and Brassica mustard oil seed production, beside that of other food staples. This will involve better management of soil, irrigation water, mineral nutrition, pests and diseases, new regimen of cultivating wheat and mustard and improved cultivars to achieve the objective. Change in the regimen of cultivation is visualized as a significant means of increasing wheat and mustard production.

Reference may be made to the article of R. A Sherry et al. (2007) Divergence of reproductive phenology under climate warming. Proc. Natl. Acad. Sci. USA 204: 198-202. This article reports about the effect of warming for induction of divergence in flowering and fruiting phenology and variation among species in the direction and magnitude of their response to warming caused compression and expansion of the reproductive periods of different species. Thus the article concludes that climate change would alter community level patterns of reproductive phenology.

The article only reports about the phenology change of different species due to change in temperature, but how to use the different phenologies of crops to increase their production is not the subject matter of the article. No reports have been found to utilize the phenology of crop varieties for increasing the production rate.

Another reference may be made to the article of S. M. S Tomar et al. (2004) Pusa Gold (WR544) a new variety for very late sown conditions. Intensive Agri. 42: 18-19.

OBJECT OF THE INVENTION

The main object of the present invention is to provide a method for tandem cropping for increased production of food grain crops.

Still another object of the present invention is to provide a method of tandem cropping for increased production of food grain crops using crop varieties with phenological plasticity and temperature tolerance traits.

Yet another object of the present invention is to provide a method for tandem cropping for the increased production of wheat and mustard:

Still another object of the invention is to provide a process for tandem cropping of two food grain crops of wheat in the extended Rabi season of September to April in the Indo-Gangetic plains agro-climate.

SUMMARY OF THE INVENTION

The present invention provides a method of tandem cropping for increased production of food grain crops using crop varieties with phenological plasticity and temperature tolerance traits. The cereal bread wheat and oil seed mustard are traditional winter season (Rabi) crops in north India/Indo-Gangetic plains. This area experiences receding levels of warm weather and long days in September, October and November, progressive increase and then decrease of cold conditions and short days between November and March and onset of warm weather turning into summer and relatively longer days in March and April. Conventionally a seasonal crop of wheat or mustard is taken in the area. Our invention stipulates that two tandem crops of wheat or mustard or wheat followed by mustard or vice versa could be taken in the winter Rabi season of Indo-Gangetic plains to increase the production of these commodities. The concept has not occurred to persons skilled in the art of wheat cultivation and breeding and as far as is known there is no report of tandem cultivation of wheat under natural seasonal changes of agro-climates in areas where wheat cultivation is practiced. For tandem cropping, wheat and mustard cultivars must possess properties of flowering under long day or short day conditions, tolerating temperature gradients and reaching maturity earlier than normal. The desirable characteristics of phenological and temperature response plasticity, that are known to occur in variant genotypes of different plant species [1], should permit such proposed profitable cultivation of wheat and mustard in the Rabi/winter season in the Indo-Gangetic plains and other geographical areas having corresponding agro-climates, where soil conditions are also similar to those prevalent in the Indo-Gangetic plains.

Accordingly, the present invention provides a method of tandem cropping for increasing the production of food grain crops, wherein the said method comprises of the following steps:
(a) selecting at least one suitable crop based on phenological plasticity characteristics and temperature tolerance traits;
(b) selecting a particular season;
(c) selecting a time duration in the range of 70-100 days between sowing and harvesting of one crop;
(d) selecting time duration in the range of 85-120 days between sowing and harvesting of the second crop tandem to the first crop as given in step (c).

In an embodiment of the present invention, the said crop used is selected from the winter season Rabi crops more preferably mustard and wheat and potato.

In another embodiment of the present invention, the crops used are mustard variety "Agrani" and/or wheat variety "Pusa Gold".

In yet another embodiment of the present invention, the tandem cropping is performed as wheat followed by wheat or mustard followed by mustard or wheat followed by mustard or mustard followed by wheat.

In still another embodiment of the present invention, the phenological plasticity possessed by crop variety is selected based on the conditions of flowering under long/short days, temperature tolerance gradients and earlier maturity capability.

In yet another embodiment of the present invention, the environmental condition used is preferably those prevalent in Indo-Gangetic plains.

Further in another embodiment of the present invention, the particular season used for sowing and harvesting is selected from September to April.

In still another embodiment of the present invention, the increase in yield of crops is in the range of 40-60% using this method.

In yet another embodiment of the present invention, the crop yield is in the range of 2-10 tonnes per hectare.

In still another embodiment of the present invention, the tandem cropping being performed by sowing one crop in September and harvesting in November/December followed by sowing second crop in November/December/January and harvesting in April.

BRIEF DESCRIPTION OF THE TABLES AND FIGURES

Table 1 shows the effect of sowing time on grain yield of bread wheat *Triticum aestivum* cultivar Pusa-Gold and Mustard *Brassica juncea* cultivar Agrani in the winter Rabi season of cultivation at New Delhi, Season 2006-2007

Table 2 shows the crop sowing and harvesting duration in case of tandem cropping with grain yield respectively, season 2006-2007.

Table 3 shows the effect of sowing time on grain yield of wheat *Triticum aestivum* cultivar Pusa-Gold in the winter Rabi season of cultivation at New Delhi, Season 2007-2008.

Table 4 shows the crop sowing and harvesting duration in case of tandem cropping with grain yield respectively with respect to conventional cropping, season 2007-2008.

DETAILED DESCRIPTION OF THE INVENTION

Figure 1A:
FIG. 1A illustrates wheat crops of three sowing dates in 5 $m^2$ plots on 22 Oct., 2007.
Figure 1B:
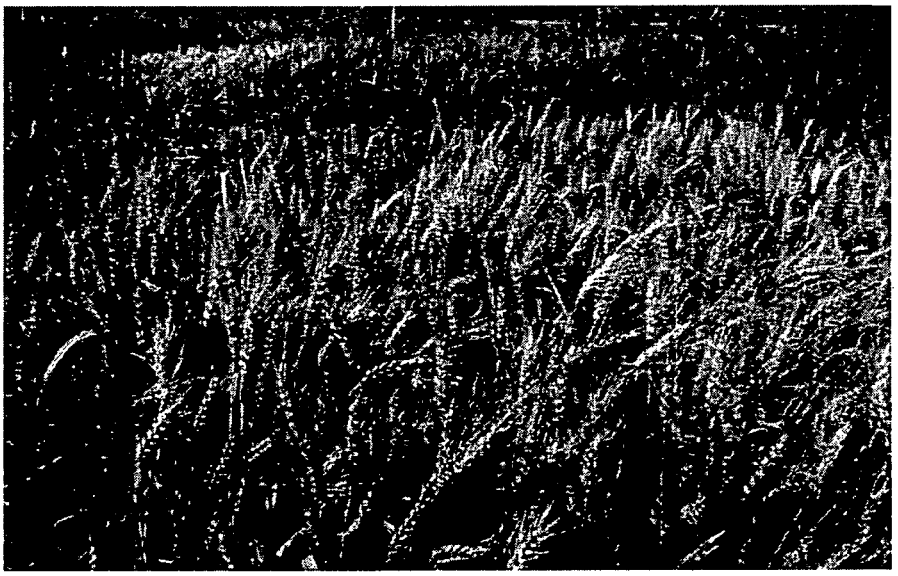
FIG. 1B illustrates wheat crops of three sowing dates in 5 $m^2$ plots on 27 Nov., 2007.
Figure 2:
FIG. 2 illustrates wheat crops of three sowing dates in 5 $m^2$ plots on 21 Feb., 2008 at the experimental farm of National institute of Plant Genome Research (NIPGR), Aruna Asaf Ali Marg, new Delhi-67, India
Figure 2:
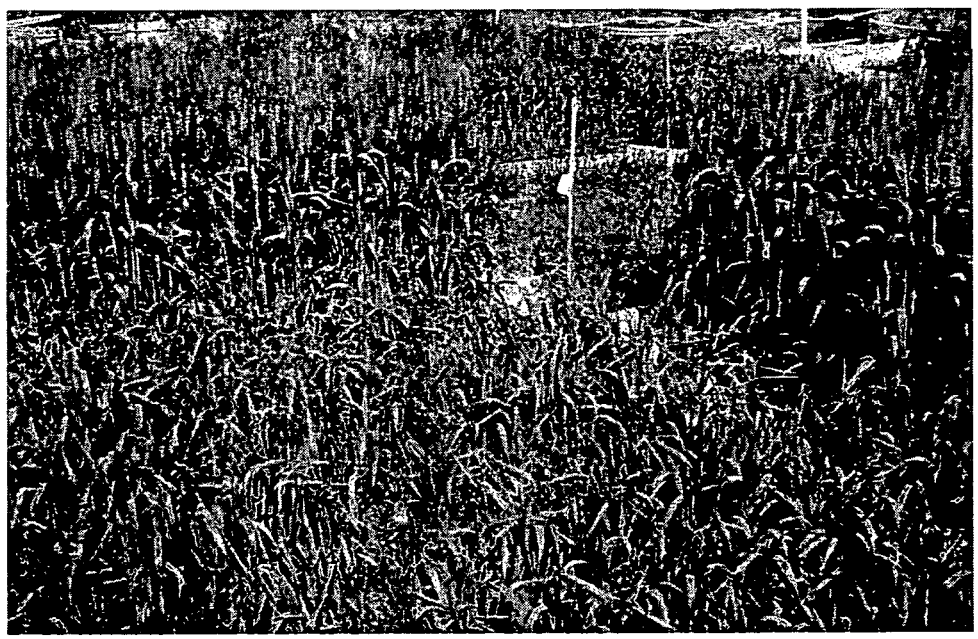

The present invention describes a method of tandem cropping for increased production of food grain crops using crop varieties with phenological plasticity and temperature tolerance traits. To support the present invention, varieties/cultivars of wheat and mustard were required that possessed the phenological plasticity and temperature tolerance traits. Bread wheat and mustard crops, although had origin in temperate area of the world, are now widely cultivated in temperate and semi-temperate areas by use of cultivars developed by application of plant breeding procedures. A search was carried out for a cultivar of wheat suitable for late planting and that of mustard possessing early maturation feature in semi-temperate areas. It was reasoned that such varieties will respond well to changes in the seasonal environments of Indo-Gangetic plains adaptively. The search led to identification of wheat variety called Pusa Gold [2] and mustard variety Agrani [brown seeded], both bred by Indian Agricultural Research Institute, New Delhi, as the experimental materials for the testing of concept of the present invention.

Phenological plasticity is a trait of plants that reflects independence of time of flowering from the controlling physical factors such as day/night lengths and temperature regimen prevalent in the growing season.

Flowering time in plants is a commonly used parameter of measuring phenological plasticity. Flowering time in plants is determined by exposure to day length and temperature in the vegetative phase. The flowering in phenologically plastic plants occurs relatively independent of the determinant factors.

Seeds of cultivar Pusa Gold WR544 (wheat) were obtained from Indian Agricultural Research Institute in September 2005 and sown in late September. Ten plants which were morphologically identical and demonstrated purity by DNA marker analysis were taken as the source of seeds for subsequent experimentation. First trial to test tandem cropping method for increased production of wheat was done in the duration from September 2006 to April 2007. The second trial was performed for the same duration in September '07 to April '08.

In 2006-07 seasons, Pusa Gold was compared with three accessions 9, 13 and 16 for flowering time and growth and yield parameters. It was identified to have characteristic phenological plasticity which can be utilized for increased crop yield. The accession 9 is having characteristics like early flowering like Pusa Gold, the spike bearing culms are wax less. Accession 13 is dwarf, late flowering than Pusa Gold and spike bearing culm is waxy. The Accession 16 is very late flowering and demonstrates little phenological plasticity.

The seeds were multiplied from breeder seed samples after testing and field experiments were carried out at the experimental farm of National Institute of Plant Genome Research, New Delhi. The design of the experiment was as follows. In the season 2006-07, there were 11 wheat crop and two mustard crop sowing treatments. Pusa Gold was sown 13 to 17 days apart starting from 18 Sep. 2006 to 17 Feb. 2007, in a randomized block design replicated four times. Agrani was sown on 15 September and 1 January with 11 replications. Approximately 1500 seeds of wheat and 1000 seeds of mustards were sown in 3 m long 10 lines opened 20 cm apart in each block of 3 m×2 m size. The N, P, K and S fertilization was given at the rate of 60, 40, 40 and 10 kg/hectare, respectively. The soil conditions were maintained as same as prevalent in the Indo-Gangetic plains. The crops were harvested block wise at grain maturity. Grains were separated from the harvest 7 to 14 days later, yield was recorded. The data has been compared with the commonly available standards of harvesting, crop duration and grain yield (control) and data was statistically analyzed.

The inventiveness of the present invention lies in identifying the specific crop varieties having characteristic phenological plasticity and temperature tolerance and using them for increasing the crop production up to 50%.

The wheat crop is normally sown in November, in the present invention, the inventor has chosen some varieties of wheat and sown in September followed by harvesting in November/December in tandem to another variety of mustard or wheat sown in November/December/January followed by harvesting in March/April and has obtained substantial increase in total yield as compared to conventional single crop.

The following examples are given by the way of illustration of the present invention and therefore should not be construed to limit the scope of the present invention.

Example 1

Bread wheat sown in third week of September and harvested at the end of December and re-sown in the first week of January and harvested in mid April gives the combined yield of 10 tonnes per hectares, i.e., 40-50% higher than the traditional single crop of wheat.

TABLE 1

| Crop | Date of Sowing | Date of Harvesting | Crop Duration (days) | Grain Yield (tonnes per hectare) |
|---|---|---|---|---|
| Bread Wheat | 18 Sep. 2006 | 16 Dec. 2006 | 90 | 5.2 ± 0.4 |
| | 1 Oct. 2006 | 15 Jan. 2007 | 107 | 6.2 ± 0.9 |
| | 17 Oct. 2006 | 6 Feb. 2007 | 112 | 5.8 ± 0.6 |
| | 1 Nov. 2006 | 26 Feb. 2007 | 118 | 7.0 ± 0.8 |
| | 15 Nov. 2006 | 17 Mar. 2007 | 123 | 7.0 ± 1.0 |
| | 1 Dec. 2006 | 29 Mar. 2007 | 119 | 7.0 ± 0.6 |
| | 15 Dec. 2006 | 3 Apr. 2007 | 109 | 4.7 ± 0.4 |
| | 1 Jan. 2007 | 7 Apr. 2007 | 97 | 4.3 ± 0.4 |
| | 15 Jan. 2007 | 14 Apr. 2007 | 90 | 4.2 ± 0.5 |
| | 2 Feb. 2007 | 21 Apr. 2007 | 79 | 3.0 ± 0.3 |
| | 17 Feb. 2007 | 25 Apr. 2007 | 68 | 2.0 ± 0.4 |
| Mustard | 15 Sep. 2006 | 20 Dec. 2006 | 97 | 3.5 ± 0.6 |
| | 1 Jan. 2007 | 10 Apr. 2007 | 100 | 2.8 ± 0.6 |

TABLE 2

| Crop duration First | Crop duration Second | Total grain yield (t/ha) |
|---|---|---|
| Sep. 18 to Dec. 16, 2006 | Jan. 01 to Apr. 07, 2007 | 9.5 |
| Oct. 01, 2006 to Jan. 15, 2007 | Feb. 02 to Apr. 21, 2007 | 9.2 |

The results presented in the Table 1 show that grains could be harvested from wheat crops sown at all the different times. The grain yield was about 7 tonnes/hectare (t/h) when crops were sown on 1 November, 15 November or 1 December; these crops took respectively 118, 123 and 119 days for maturity. The yield was 5.2 and 6.2 t/h for wheat crops sown earlier to these on 18 September and on 1 October which took 90 and 107 days to mature respectively. The wheat crops sown on 15 December, 1 January, 15 January and 2 February, that took 110, 97, 90 and 79 days to maturity, yielded grains at the rate of 4.7, 4.3, 4.2 and 3.0 t/h, respectively. It is therefore expected that wheat crops sown between 18 September and 1 October will yield about 5.7 t grains/h and those sown between 15 December and 2 February yielded 4.1 tonnes grains/h. Thus two crops of wheat grown in tandem will give about 9.8 t/h or produce 40% more wheat grains than the conventional single crop of wheat. The table also shows that mustard can be sown in tandem with wheat crop in wheat→mustard or mustard→wheat schedules.

Example 2

Mustard sown in early September and harvested in mid December will give 3 t/h yields of oil seed grains and the same field sown with wheat in late December or early January will give 5 t/h of cereal grains.

Table 3: Effect of sowing time on grain yield of wheat *Triticum aestivum* cultivar Pusa-Gold in the winter Rabi season of cultivation at New Delhi, Session 2007-2008

TABLE 3

| Serial No. | Date of Sowing | Date of Harvesting | Crop Duration (days) | Grain Yield (tonnes per hectare) |
|---|---|---|---|---|
| 1 | 1 Sep. 2007 | 17 Nov. 2007 | 78 | 4.1 ± 0.7 |
| 2 | 8 Sep. 2007 | 27 Nov. 2007 | 80 | 4.5 ± 0.6 |
| 3 | 15 Sep. 2007 | 15 Dec. 2007 | 91 | 4.8 ± 0.5 |
| 4 | 22 Sep. 2007 | 31 Dec. 2007 | 100 | 5.2 ± 0.2 |
| 5 | 29 Sep. 2007 | 14 Jan. 2008 | 108 | 5.3 ± 0.2 |
| 6 | 20 Nov. 2007 | 16 Mar. 2008 | 118 | 7.0 ± 0.9 |
| 7 | 30 Nov. 2007 | 23 Mar. 2008 | 115 | 5.9 ± 0.1 |
| 8 | 18 Dec. 2007 | 1 Apr. 2008 | 105 | 4.9 ± 0.2 |
| 9 | 3 Jan. 2008 | 7 Apr. 2008 | 96 | 3.7 ± 0.3 |
| 10 | 16 Jan. 2008 | 14 Apr. 2008 | 90 | 3.3 ± 0.1 |

TABLE 4

| Crop duration First | Crop duration Second | Total grain yield (t/ha) |
|---|---|---|
| Sep. 1 to Nov. 17, 2007 | Nov. 20 to Mar. 16, 2008 | 11.1 |
| Sep. 08 to Nov. 27, 2007 | Nov. 30, 2007 to Mar. 23, 2008 | 10.4 |
| Sep. 15 to Dec. 15, 2007 | Dec. 18, 2007 to Apr. 01, 2008 | 9.7 |
| Duration of conventional crop | | |
| Nov. 15, 2006 to Mar. 15, 2007 | | 7.0 |
| Nov. 20, 2007 to Mar. 16, 2008 | | 7.0 |

During 2007-08, wheat crops were sown between September 1 to September 29 at an interval of 1 week; these were then harvested at grain maturity as second round crops were sown after 3-4 days, which were harvested as shown in the Table 2. The analysis of data shows that the crop harvested between 1 September to 17 November and 20 Nov. 2007 to 16 Mar. 2008 gave a yield of 11.1 tonnes per hectare; crop harvested between 8 Sep. 2007 to 27 Nov. 2007 and 30 Nov. 2007 to 23 Mar. 2008 yielded up to 10.4 tonnes per hectare. Similarly, tandem cropping performed between 15 Sep. 2007 to 15 Dec. 2007 and 18 Dec. 2007 to 1 Apr. 2008 gave a yield of 9.7 tonnes per hectare. As compared to conventional single crop yield, the total yield is of tandemly grown wheat crop at least up to 40-60% higher.

Example 3

Wheat sown in September and harvested in December will give nearly 6 t/h of cereal grains and in the same field mustard crop, sown in January and harvested in April give 3 t/h of oil seeds.

The optimum results were obtained when mustard, potato or wheat was used as first crop and wheat as second crop. The gap between harvesting of first crop and sowing of the second crop in the process of tandem cropping should not be more than 15-20 days, however the gap should be as small as possible to realize the full potential of tandem cropping.

All the examples support the concept of tandem cropping of wheat, which was field tested experimentally and it was demonstrated that the production of selected crops can be increased by tandem cropping in the winter Rabi season of September to April using the following schedule wheat→wheat, mustard→wheat or wheat→mustard. Although some existing cultivars are suitable to practice the proposed schedules of tandem cultivation, there is need to breed varieties to fit into these schedules to harvest full potential of seasonal tandem cultivation.

I claim:

1. A method of tandem cropping for increasing the production of wheat comprising the steps of:
   (a) selecting a variety of wheat having an early maturation capacity ranging between 70-120 days;
   (b) sowing a first crop of said variety of wheat between the first and third weeks of September and harvesting said first crop between the fourth week of November and the fourth week of December; and then
   (c) sowing a second crop of said variety of wheat between the first week of December and third week of January and harvesting said second crop between the third week of March and the fourth week of April; sowing said second crop 20 days or fewer after harvesting said first crop;
   wherein two crops of wheat are obtained in one season and the combined yield of said first crop and said second crop is in the range of 9-11 tons/hectare.

2. A method according to claim 1 wherein said wheat is wheat variety "Pusa Gold" WR 544.

3. A method according to claim 1, wherein the combined yield of said first crop and said second crop of wheat is in the range of 30-50% higher than a conventionally sown crop of wheat.

4. A method according to claim 1, wherein the yield of said first crop is in the range of 4-6 tons/hectare and the yield of said second crop is in the range of 3-7 tons/hectare.

* * * * *